United States Patent [19]
Shingleton

[11] Patent Number: 6,058,930
[45] Date of Patent: May 9, 2000

[54] SOLAR COLLECTOR AND TRACKER ARRANGEMENT

[76] Inventor: Jefferson Shingleton, 7322 Parcell Rd., Auburn, N.Y. 13021

[21] Appl. No.: 09/294,902

[22] Filed: Apr. 21, 1999

[51] Int. Cl.[7] .................................................. F24J 2/54
[52] U.S. Cl. ................................. 126/600; 126/605
[58] Field of Search ................... 126/600, 606, 126/605, 607, 576, 577; 359/430; 248/185.1

[56] References Cited

U.S. PATENT DOCUMENTS

| | | |
|---|---|---|
| 4,000,734 | 1/1977 | Matlock et al. . |
| 4,103,672 | 8/1978 | Meyer . |
| 4,138,994 | 2/1979 | Shipley, Jr. ................... 126/600 |
| 4,159,710 | 7/1979 | Prast . |
| 4,173,213 | 11/1979 | Kelly . |
| 4,184,482 | 1/1980 | Cohen . |
| 4,187,123 | 2/1980 | Diggs . |
| 4,316,448 | 2/1982 | Dodge . |
| 4,771,764 | 9/1988 | Cluff . |
| 4,995,377 | 2/1991 | Eiden . |
| 5,228,924 | 7/1993 | Barker et al. . |
| 5,253,637 | 10/1993 | Maiden . |
| 5,542,409 | 8/1996 | Sampayo ........................ 126/606 |
| 5,730,117 | 3/1998 | Berger ........................... 126/600 |

FOREIGN PATENT DOCUMENTS

| | | | |
|---|---|---|---|
| 56-118021 | 2/1983 | Japan ................... | 126/606 |

Primary Examiner—Ira S. Lazarus
Assistant Examiner—Sara Clarke
Attorney, Agent, or Firm—Trapani & Molldrem

[57] ABSTRACT

A solar energy collector and tracker has at least one north-south oriented torsion tube supporting an array of flat rectangular solar panels. At least one pier, supported in the earth, has pivot member in which the torsion tube is journalled. A linear actuator has a body portion mounted on a footing separate from the pier footing and supported in the earth at a distance spaced from pier, and has a rod coupled to a torque arm on the torsion tube. The actuator can be horizontally or vertically oriented. The torsion tube is generally square cross section. The torsion tube may be formed of two or more sections joined end to end. In such case, one of the sections may have one end swaged to fit tightly into the end of a next successive section to form a tight, secure coupling between sections. The pivot member can have four plastic resin inserts within a cylindrical journal on respective sides of the square torsion tube. The horizontal driver can be used to drive multiple rows of solar panels, with a linkage mechanism connecting the torque arms of the multiple rows. The linkage mechanism can include a series of rigid link members articulated to one another, permitting use on uneven terrain. Wires can be concealed within the tubular members.

19 Claims, 7 Drawing Sheets

SOLAR COLLECTOR AND TRACKER ARRANGEMENT

BACKGROUND OF THE INVENTION

This invention relates to solar energy collection, and in particular to an arrangement for driving a number of rows of solar panels to track the motion of the sun relative to the earth. The invention is more particularly directed to improvements in efficiency and reliability in the tracker arrangement for rocking, or rotating, a group or array of rows of solar panels. The invention applies to solar collectors in which the panels are arrays of photovoltaic cells for generating electrical power, but the same principles can be applied also to arrangements for solar heating, for example.

Photovoltaic arrays are used for a variety of purposes, including as a utility interactive power system, as a power supply for a remote or unmanned site, a cellular phone switch-site power supply, or a village power supply. These arrays can have a capacity from a few kilowatts to a hundred kilowatts or more, and can be installed wherever there is a reasonably flat area with exposure to the sun for significant portions of the day.

In general terms, these systems have their photovoltaic panels in the form of rows supported on a torque tube that serves as an axis. A tracker drive system rotates or rocks the rows to keep the panels as square to the sun as possible. Usually, the rows are arranged with their axes disposed in a north-south direction, and the trackers gradually rotate the rows of panels throughout the day from an east-facing direction in the morning to a west-facing direction in the afternoon. The rows of panels are brought back to the east-facing orientation for the next day.

One solar collector arrangement of this type is shown in Barker et al. U.S. Pat. No. 5,228,924. There, each row of panels is affixed to a horizontal pivot shaft that is supported on two or more support piers on which the pivot shaft is journalled. A drive mechanism is mounted on one of the piers, and pushes against the solar panel at some point that is displaced from the shaft. In that case, the drive is of the screw type, and as a drive motor rotates, a shaft retracts or extends to rotate the row of panels in one direction or the other. In this arrangement, each row of panels has its own respective drive mechanism, and so these all have to be synchronized to follow the sun together. With a pier-mounted drive, it is difficult or impossible to use a single driver to move more than one row of solar panels.

One problem with this arrangement, i.e., with the pier mounted drive mechanisms, is their difficulty in dealing with the enormous torque loads that can result from winds and other weather phenomena. There is great complexity in the drive and pier fittings because of this. Moreover, the pier itself has to be strengthened to carry the drive forces to the foundation in which it is mounted. The pier also is subjected to bending loads imposed by the pier-mounted drive. Because the pivot shaft and drive are both mounted on the pier, it is not possible to accommodate a large torque arm or lever arm, and so this imposes a large load factor onto the drive mechanism.

Conventional trackers of this type typically employ square steel tubes as beams that span between piers because, given the presence of wind-generated loads, this shape better carries the torsion loads between the panels and the drive. However, in order to join successive sections of a square torque tube or beam, special connectors are required, which add complexity and expense to the construction. Also, these square torque tubes have to be accommodated both rotationally, radially, and axially, where they are journalled in the supporting piers, because of the weight and wind loading of the panels, and because of thermal expansion of the torque tube. Over time, metal-to-metal contact between the torque tube and the journal will destroy corrosion-protective finishes. However, the bearings or pivot journals for the conventional tracker systems do not address these problems.

OBJECTS AND SUMMARY OF THE INVENTION

Accordingly, it is an object of the present invention to provide a solar tracker arrangement that avoids the drawbacks of the prior art.

It is another object to provide a solar tracker arrangement that addresses problems of mechanical stresses and accommodates wind loading and high torque in solar tracking.

It is a further object to provide a solar tracking arrangement that employs a single actuator to control multiple rows of solar panels.

In accordance with an aspect of the present invention, a solar energy collector and tracker arrangement has a tracker associated with at least one row of solar panels. A north-south oriented torsion tube defines a north-south axis and an array of flat rectangular solar panels are attached in a generally balanced fashion on opposite sides of the torsion tube. There is at least one pier whose footing is supported in the earth. A pivot member is affixed to the pier above its footing and the torsion tube is journalled in this pivot member. This permits the array of solar panels to be rocked on the north-south axis to follow motion of the sun relative to the earth. A torque-arm member is affixed onto the torsion tube and has an eye portion displaced from the north-south axis. A linear actuator has a body portion mounted on a footing spaced apart from the pier and supported in the earth at a distance spaced from pier. A rod extends from the body portion and has a distal end coupled to the eye portion of the torque-arm member. In one embodiment, the actuator is vertically oriented and said rod extends generally vertically from the body portion to the eye portion of the torque-arm member. In other embodiments, the actuator is horizontally oriented and the rod extends generally horizontally from the body portion to the eye portion of a torque-arm member. In that case, the torque-arm member can be oriented at generally a right angle to the plane of the solar panels.

In a preferred embodiment, the torque tube is generally square cross section. The torsion tube may be formed of two or more sections joined end to end. In such case, one of the sections may have one end swaged to fit tightly into the end of a next successive section to form a tight, secure coupling between sections.

Preferably, the pivot member includes a bearing formed of an outer cylindrical journal and four inserts disposed within the cylindrical journal on respective sides of the squarecross-section torque tube. The inserts can be formed of a plastic resin containing a lubricant filler. This arrangement is resistant to weather phenomena, and can withstand the high loads expected with solar panels.

A solar energy collector and tracker arrangement according to another aspect of this invention employs multiple parallel rows of solar panels, wherein each row includes a north-south oriented torsion tube and an array of flat generally rectangular solar panels attached in generally balanced fashion along opposite sides of the associated torsion tube. For each row of solar panels there is at least one pier having a footing supported in the earth (or equivalent foundation) and a pivot member affixed onto the pier above the footing in which the associated torsion tube is journalled. The multiple of rows of solar panels are rocked or tilted together on their north-south axis to follow motion of the sun. A respective torque-arm member is supported on each torsion tube and each one has an eye portion displaced from the north-south axis at a generally right angle relative to the plane of the solar panels. A tracker drive moves all of the multiple rows. In the preferred embodiment, this tracker drive includes a linear actuator having a body mounted on a footing that is supported in the earth and a rod that extends generally horizontally from the body. A coupling arrangement mechanically couples the rod to the eye portion of the torque-arm member of a first one of the rows. Then, a rigid linkage mechanism extends generally horizontally from the torque-arm member of the first row to the torque-arm members of the others of said rows. Favorably, the rigid linkage mechanism includes a series of rigid link members articulated to one another and to the torque arm members of the respective rows of solar panels. The articulated link members permit the solar trackers to be employed on uneven terrain yet still require only a single tracker drive.

The articulated link, torsion tube, and torque arms may serve as conduits for the passage of electrical wiring, reducing excavation and buried conduit costs.

The longer lever arm or torque arm permits larger torques to be absorbed by the driver mechanism. By displacing the driver mechanism from the pier or piers, the loads are transmitted to the earth, and do not produce bending forces on the piers as is common in the prior art arrangements. A ground-connected drive configuration optimizes the drive geometry and minimizes drive forces. Also, this arrangement is more economical and simpler to install and maintain. The conventional pier-connected driver, on the other hand, is much more complex mechanically, both in the drive itself and in the pier fitting. The conventional pier has to be stronger in order to carry the drive forces to the foundation, and also has to withstand bending loads imposed by the pier-mounted drive. It is not possible to accommodate as long a drive as is possible with a ground-connected drive, and so the lever arm is shorter than with this invention, necessitating much higher linear forces. On the other hand, in this invention the drive loads are transmitted directly to the foundation, and are more efficiently transmitted to the ground. The drive of this invention does not impose significant bending loads on the piers. The drive can be much longer, reaching all the way to the ground, to accommodate large torque arms and maximize the effectiveness of the drive. Since the drive is optimized by use of long torque arms, the drive can be constructed with a longer stroke (and smaller linear force) than can be accommodated in the prior art.

The torsion tube coupling of the prior art had usually joined two square torsion tubes at the pier, with the two square tubes being both inserted into a larger square sleeve coupling. The sleeve is usually positioned in the journal and itself typically serves as a bearing. However, with the arrangement of this invention, i.e., the swaged tube ends of torsion tubes, one end of each torque tube fits tightly into the open end of the next torque tube. This eliminates the extra fabricated sleeve and produces a tighter connection between adjacent torsion tubes. Also, the positions of the joints between sections need not be aligned precisely with the piers.

The bearing arrangement of this invention, with the four bearing pads disposed at the sides of the square torsion tube, avoids steel-on-steel sliding contact that can destroy corrosion-protective finishes. Also, this arrangement permits some axial motion of the torsion tube, to accommodate lengthening and shortening of the steel torque tubes due to weather extremes. The bearing materials themselves, i.e., high-density polyethylene or polypropylene, can be infused with lubricants and with UV inhibitors, such as carbon black, and will enjoy long life in the field. These segmented bearing pads can be fabricated easily and at low cost.

The above and many other objects, features, and advantages of this invention will become apparent from the ensuing description of a selected preferred embodiment, which is to be considered in connection with the accompanying Drawing.

DETAILED DESCRIPTION OF THE PREFERRED EMBODIMENTS

Figures 1A, 2A:
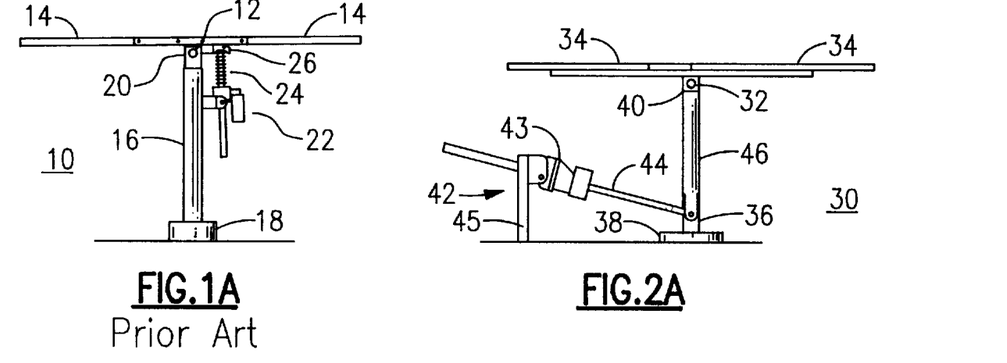
FIGS. 1A, 1B, and 1C are end elevations showing a row of solar panels having a pier mounted driver according to the prior art.
FIG. 2A, 2B, and 2C are end elevations showing a row of solar panels having a horizontal ground-supported driver according to an embodiment of this invention.
Figures 1B, 2B:
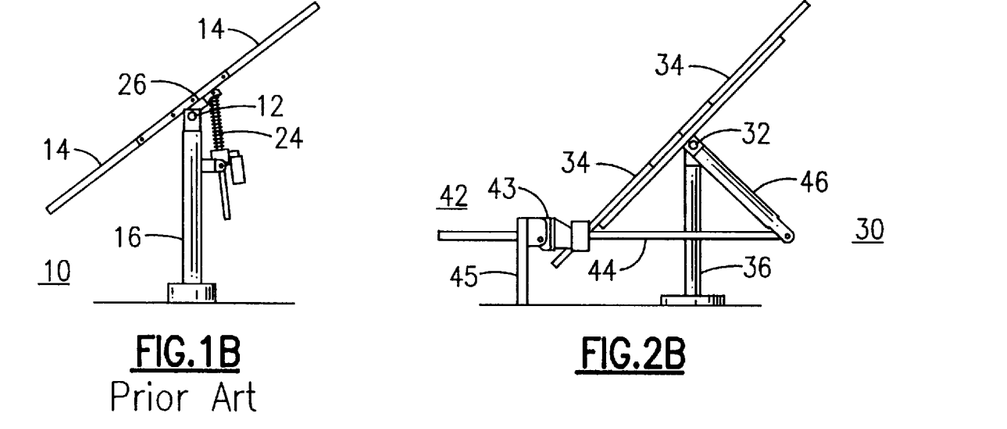
Figures 1C, 2C:
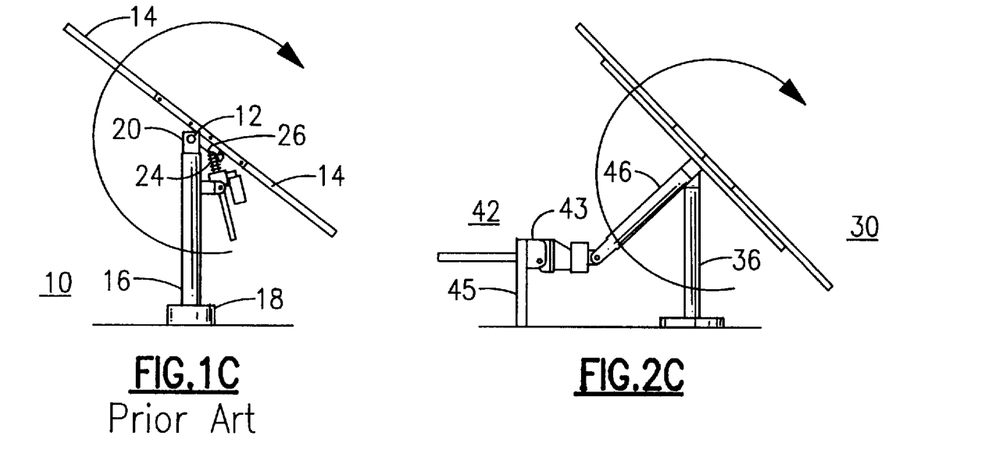

With reference to the Drawing, and initially to FIGS. 1A to 1C, a solar tracker array 10 according to the prior art, here is shown from a north aspect. A torque tube 12 serves as a north-south axis, and a row of solar panels 14 is attached onto the tube 12. These are balanced with panels similarly situated on both the east and west sides of the axis. However, as used here the term "balanced" is not strictly limited to having the panels arranged in identical fashion on each side of the tube 12. Some imbalance can be permitted, depending on mechanical factors. A vertical pier 16 has a footing 18, e.g., formed of poured concrete, serving as a foundation that is supported in the earth. There is a pivot eye 20 at the top of the pier to support the torque tube 12 so that the row of solar panels 14 can be rocked from an east-facing orientation (FIG. 1B) throughout the day to a mid-day, generally flat orientation (FIG. 1A) and to a west-facing orientation (FIG. 1C). In order to effect rocking motion of the array 10, a tracker actuator 22 is mounted onto the pier 16, and has an extendible rod member 24 that is pinned to the distal end of a torque arm or lever arm 26. In this configuration, the torque arm is about fifteen inches from the axis of the torque tube 12 to the rod member 24, and the linear actuator 22 has a stroke capacity of about twenty-four inches. The width of the row of solar panels 14 is about 12 feet. Here, the torque arm 26 is shown as a separate member attached to the torque tube, and disposed parallel to the plane of the solar panels 14. However, in some equivalent arrangements, a pipe or bar could be used, situated parallel to the torque tube and carried on one side of the row of panels 14. As discussed previously, with the pier-connected drive of this arrangement, the tracker arrangement is limited only to a vertical drive arrangement, and a separate driver is required for each row of solar panels. The pier 16 has to be of very heavy construction because it has to bear the weight of the tracker drive as well as the weight of the panels, and because it must endure bending torques imposed by the pier-mounted drive. The stroke of the tracker drive is necessarily limited, and so the possible length of the torque arm 26 is likewise limited. This means that the drive force that the actuator 22 has to impose must be rather high An embodiment of this invention is shown in FIGS. 2A to 2C, which show a solar tracker array 30, viewed along its north-south axis, and rocked into its mid-day orientation (FIG. 2A), an east-looking orientation (FIG. 2B) and a west-looking orientation (FIG. 2C). A row of solar panels 34 is supported in a balanced manner by a torque tube 32 which is journalled in a bearing 40 on top of a pier 36. As in FIGS. 1A to 1C, the pier has a footing 38 set into the earth (or equivalent foundation). In this case, a torque arm 46 is disposed vertically (in FIG. 2A), that is, generally perpendicular to the plane of the solar panels 34, mounted at one end to the torque tube 32. A horizontal tracker driver is formed of a linear actuator 42 having a body portion 43 that is attached to a fixed mount 45 set into the earth at some distance from the footing 38 for the pier. The actuator 42 has a generally horizontal rod member 44 that is pinned to the distal end of the torque arm 46. Because the actuator 42 is spaced from the pier 36, the stroke length of the rod member 44 can be quite long. Also, the length of the torque arm 46 can be long, and can be the length of the pier, meeting the end of the rod member 44 at ground level. If the earth is dug trenched out at this area, the length of the torque arm can exceed the height of the pier. The long torque arm reduces the amount of linear force required to rock the solar panels. Also, because of the extended torque arm 46, the actuator 42 is able to absorb greater torque loads, e.g., due to winds.

Figure 3A:
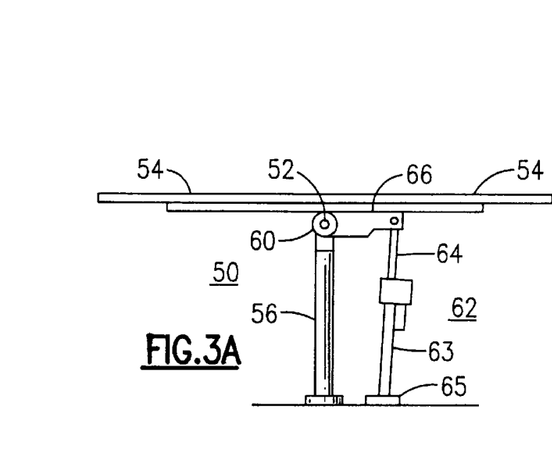
FIGS. 3A, 3B, and 3C are end elevations showing a row of solar panels having a vertical ground-supported driver according to another embodiment of this invention.
Figures 3B, 3C, 13, 14:
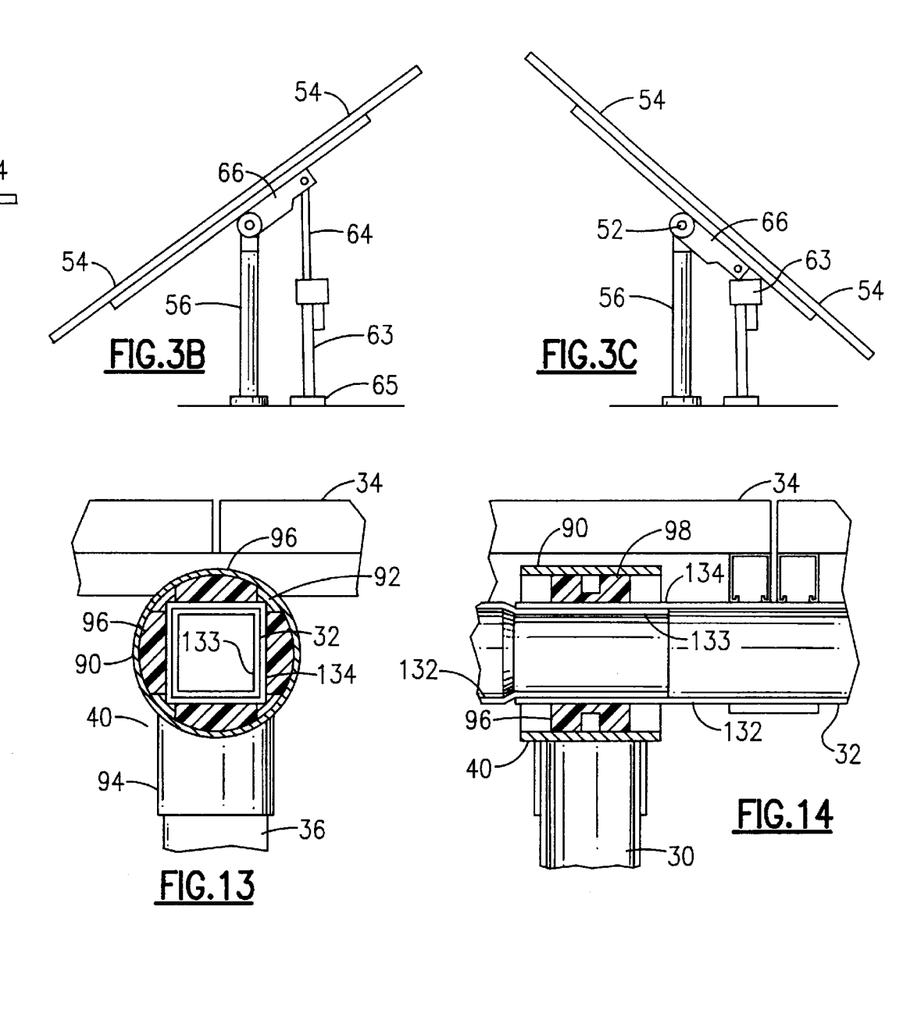
FIGS. 13 and 14 are a cross section and an axial section of the torque tube and pier bearing, showing a coupling between torque tube sections according to an embodiment of this invention.

Another embodiment of this invention, has a vertical ground-connected drive arrangement, and is shown in FIG. 3A to 3C. Here a row 50 of solar panels 54 is mounted on a torsion tube 52 that is supported in bearing members 60 atop one or more piers 56, each pier having a footing 58 supported in the earth. A linear actuator 62 has a vertically oriented body member 63 and a rod member 64 that extends generally upwards to a torque arm 66 that is fixed to the torsion tube 52. The body portion is supported on a mount or footing 65 that is separated from the footings for the piers. In some embodiments, however, the actuator can share the same footing as one or more of the piers, as long as the long throw lever arm or torque arm is achieved. In this case, the length of the torque arm 66 is considerably larger than the torque arm 26 of the prior art.

Figure 4A:
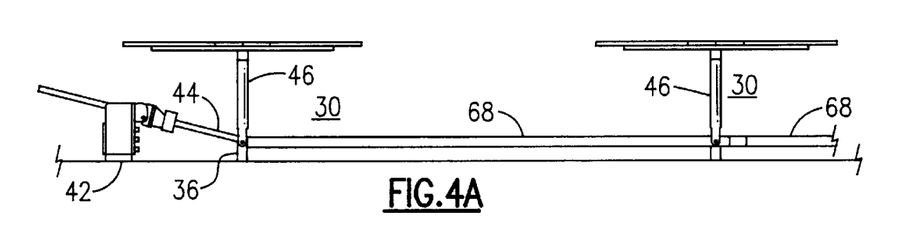
FIGS. 4A, 4B, and 4C are end elevations of a plurality of rows of solar panels employing a ground-supported horizontal drive arrangement according to this invention.
Figure 4B:
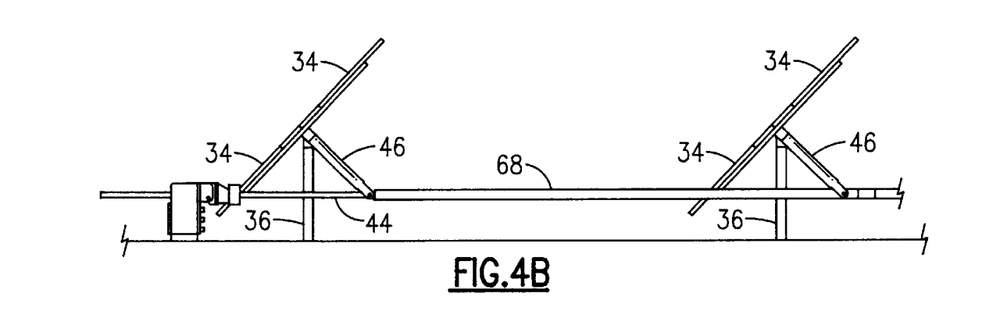
Figure 4C:
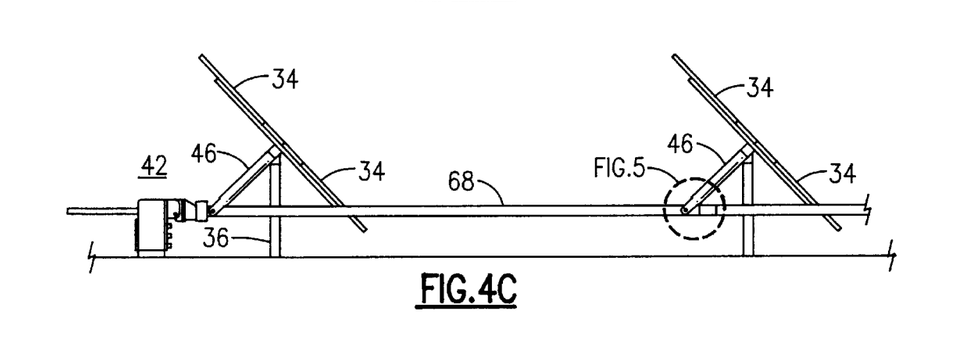
Figure 5:
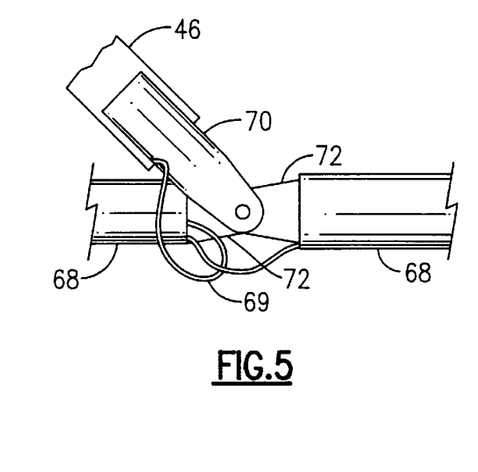
FIG. 5 is a detail view showing the linkage articulation feature of this invention.

An array of rows of solar panels can all be driven by a single horizontal linear actuator, and an example of this configuration is illustrated in FIGS. 4A, 4B, and 4C. Here, there are a series of row arrangements 30 as in FIGS. 2A–2C, all arranged in parallel, with their respective torsion tubes 32 disposed in a north-south orientation. A single horizontal tracker driver 42 has its rod member 44 connected to the torque arm 46 of a first one of the row arrangements 30. A horizontal tubular link member 68 then joins that torque arm 46 to the next torque arm 46. In like manner, successive link members 68 are disposed across the entire group of row arrangements. These link members 68 are articulated to the torque arms 46 and to one another as illustrated in FIG. 5. Wires 69 may be run inside the tubular members. Here, a distal end 70 of the torque arm 46 is connected with a pivot pin to eye members 72 at the ends of the link members 68. Of course, in other embodiments, a single rigid elongated member could be employed in place of a series of articulated link members. In this embodiment, the single driver 42 moves all the row arrangements 30 of the array from an east-facing orientation (FIG. 4B) through a mid-day orientation (FIG. 4A) to a west-facing orientation (FIG. 4C). Also, in this arrangement, the driver is shown positioned at the first or easternmost one of the row arrangements 30, but the driver 42 could be positioned with an interior row or with the row at the other end.

Figure 6A:
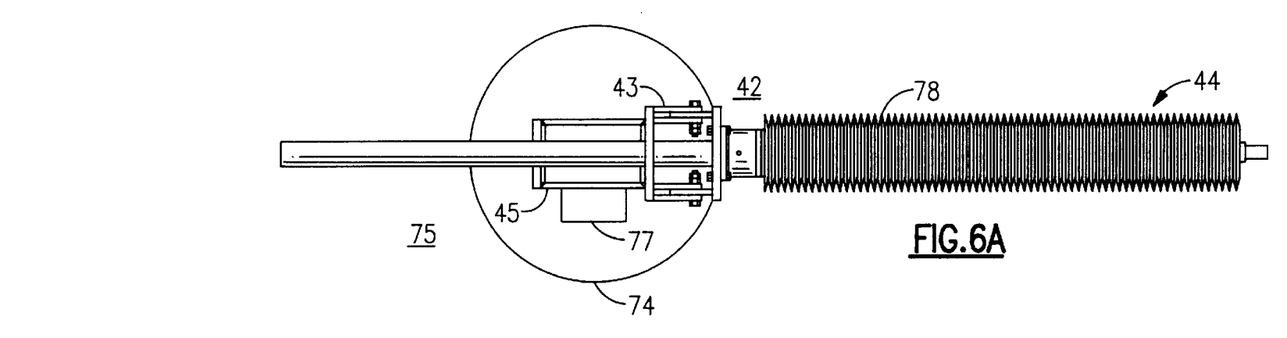
FIG. 6A is a top view of a horizontal driver of this embodiment.
Figure 6B:
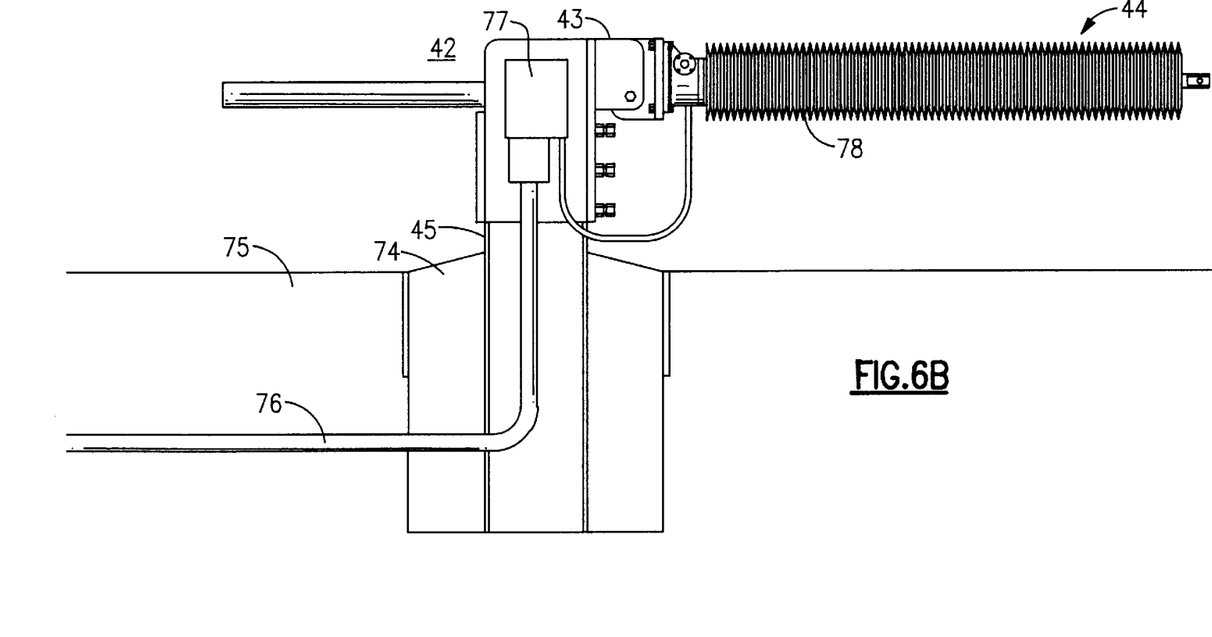
FIG. 6B is a side elevational view thereof.

Details of the horizontal driver or linear actuator 42 are shown in FIGS. 6A and 6B. Here the mount 45 for the actuator is secured in a poured concrete footing 74 in the earth 75. The footing can be of 3000 psi concrete, about two feet in diameter and about five to six feet in depth, with the soil about it being recompacted. Also shown here are an electrical conduit 76 bringing power and signal to an electrical distribution box 77 mounted on the side of the actuator 72. Also shown here is a protective boot or sleeve 78 that fits over the rod member 44.

Figure 7:
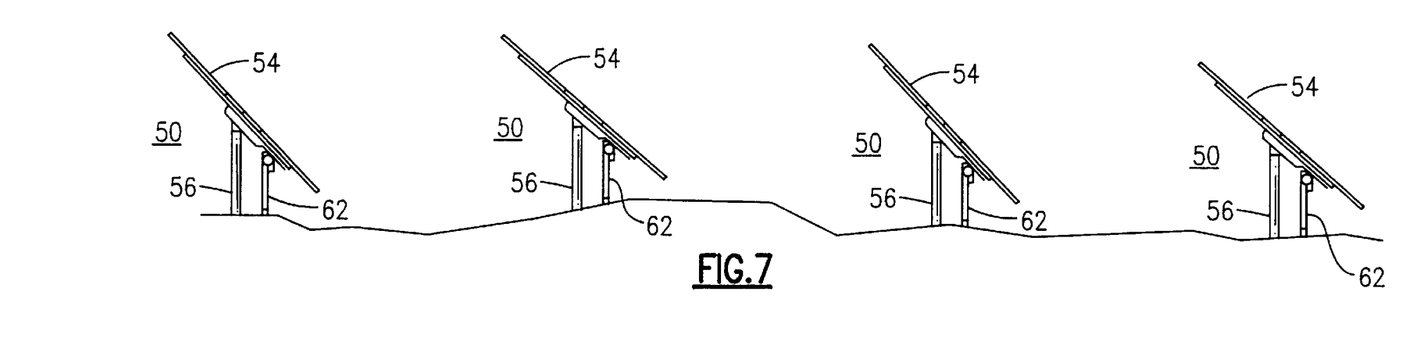
FIG. 7 illustrates a plurality of rows of the vertical driver solar panels of this invention, configured for uneven terrain.
Figure 8:
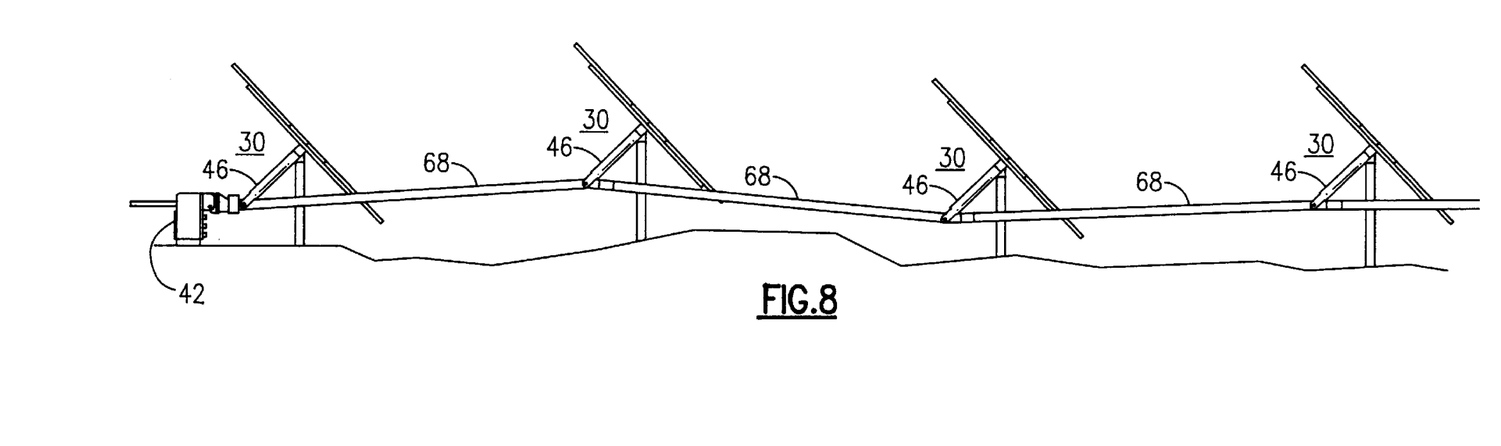
FIG. 8 illustrates a plurality of rows of the horizontal driver solar panels of this invention configured for uneven terrain.

The solar panel arrangements of this invention can be installed on uneven terrain as generally illustrated in FIGS. 7 and 8.

In the FIG. 7 arrangement, a plurality of row arrangements 50 of the type with vertical drivers (as shown in FIGS. 3A–3C) are each installed in parallel. In this arrangement, each of the rows can be selectively programmed for respective degrees of tilt in the early morning and late afternoon so as to create a minimum of shadow on the next adjacent row of solar panels, as they may be at different altitudes. Here, the piers 56, panels 54, and actuators 62 are as generally described earlier.

In the FIG. 8 arrangement, a series of row arrangements 30 of the type having a horizontal driver are employed, e.g., as shown in FIGS. 2A–2C and 4A–4C. The piers 36, panels 44, torque arms 56, and the actuator 42 are as generally described before. The articulated linkage mechanism, formed of the series of articulated rigid link members 68, accommodates differences in elevation, as shown, yet achieves accurate tracking.

Figure 9A:
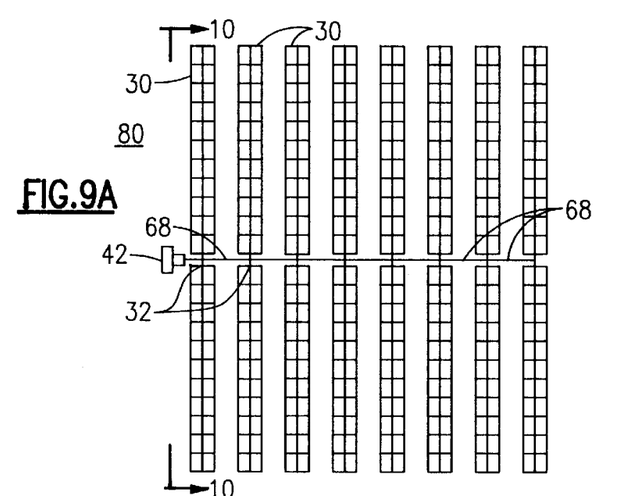
FIGS. 9A, 9B, and 9C are plan views of arrays of rows of solar panels according to embodiments of this invention.
Figure 9B:
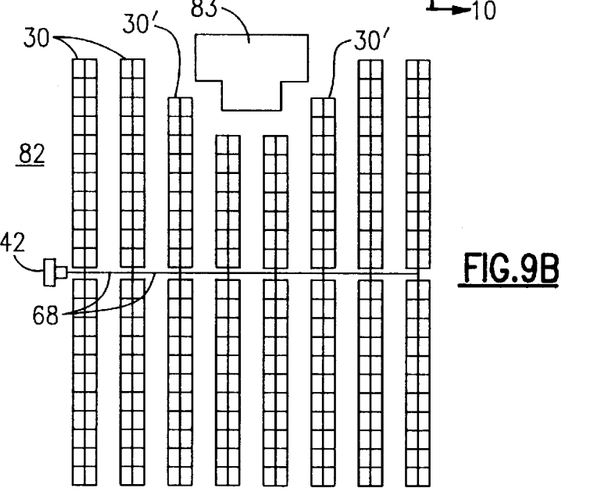
Figure 9C:
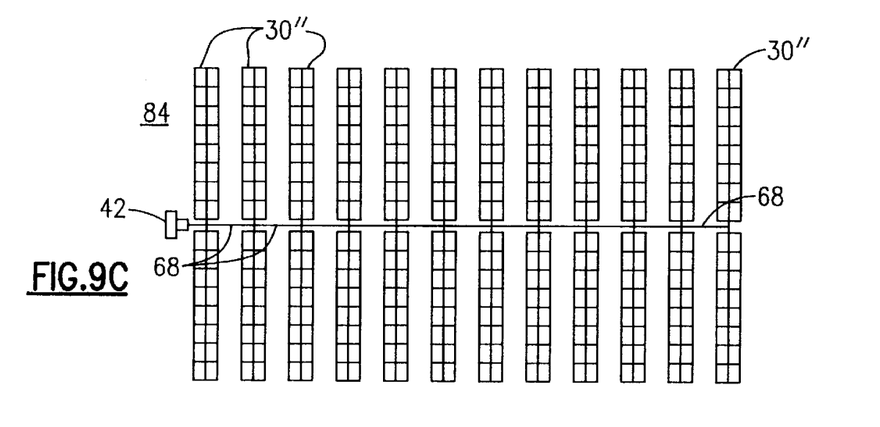
Figure 10:
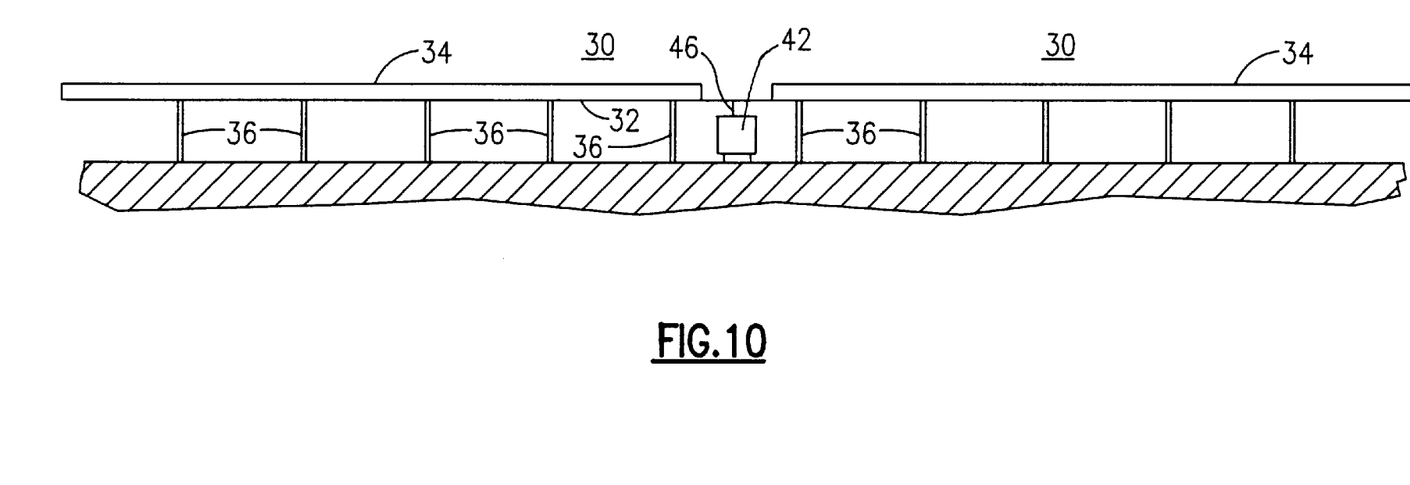
FIG. 10 is an elevation taken at 10—10 in FIG. 9A.

Several configurations of a large solar array according to this invention are shown in plan in FIGS. 9A, 9B, and 9C, with the understanding that these are only some of many possible configurations. A generally standard configuration of a solar array 80 is shown in FIG. 9A, where there are eight rows 30 of solar panels arranged in parallel. Each row has two wings of equal size, one north of the actuator 42 and linkage mechanism 68, and the other to the south of them. This is shown in elevation in FIG. 10, where each row 30 has its torsion tube 32 supported on a number of spaced piers 36, and with the driver actuator 42 situated at a central position between two of the piers. The torque arms 46 are affixed onto the torsion tubes 32 at this position.

As shown in FIG. 9B, a solar array 82 can include one or several rows 30' that are somewhat shortened in respect to the others in order to accommodate an obstruction 83, which may be a building, a rock outcropping, or other feature. Alternatively, depending on the site dimensions, a solar array 84 as shown in FIG. 9C can have a larger number of rows 30", which in this embodiment each have a smaller number of solar panels. Other configurations are also possible. For example, the rows can each have more solar panels to one side or the other of the position of the driver and linkage mechanism.

The coupling arrangement of torque tube sections according to this invention and the bearing design for supporting the torque tube on the piers are also novel.

Conventional tracker arrangements of the type described here generally utilize square steel tubes as beams spanning between piers, and this is regarded as optimum for carrying wind-generated torsion to the drive mechanism. The torque tube sections for adjacent spans are typically joined together at the piers, usually by insertion of their ends into a larger square tubular sleeve. This is often a part of the bearing and has to endure the rotational friction where the torque tubes are journalled. A disadvantage of the use of these steel sleeves in bearings is that they have to accommodate both rotary motion and also sliding motion resulting from thermal expansion of the equipment. The steel sleeve is in moving contact with the pier weldment. Over time, the steel-on-steel sliding contact will destroy corrosion-protective finishes, and will eventually erode the structural steel load-bearing material.

Figure 11:
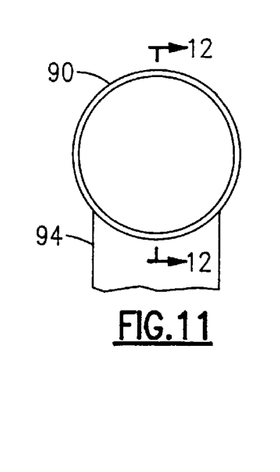
FIGS. 11 and 12 are an end view of a bearing sleeve for this embodiment, and a cross section taken at 12—12 of FIG. 11, respectively.
Figure 12:
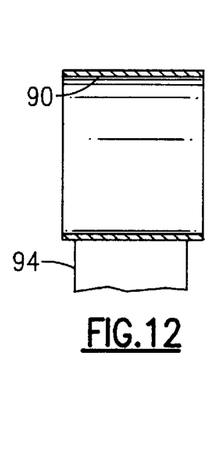

As shown in FIGS. 11 and 12, the bearing arrangement according to this invention has a bearing eye 40 which may be welded to the top of the pier 36. Here there is a generally cylindrical outer portion 90. A tubular stub 94 is welded to the cylindrical portion 90 and is mated to the pier 36. The square torque tube 32 is supported for rotation inside the cylindrical portion, by means of four plastic bearing inserts 96. Each bearing insert is disposed against a respective flat side of the torque tube 32, and each insert has a flat side facing the torsion tube 32 and a generally rounded side facing the inner wall of the outer bearing portion 90. These inserts 96 can be provided with a notch 98 so that the inserts may be bound to the torsion tube with tension bands 92. Alternatively, the inserts may be attached with screws or other means. Preferably, the plastic inserts 96 are formed of a durable resin such as polyethylene or polypropylene, with a suitable lubricant filler. A UV protective additive, such as carbon black, can also be used. These inserts can be cut from a flat sheet of material and need not be formed by expensive molding techniques. It should be appreciated that the inserts 96 easily accommodate both rotary motion of the torsion tube and also linear motion (e.g.; due to thermal expansion).

As also shown in FIG. 13, the torsion tube 32 is formed of successive tube sections 132, 132. Each section 132 has one swaged end 133 and one unswaged end 134. The swaged tube end 133 fits tightly into the unswaged end 134 of the next adjacent tube section. This eliminates the additional fabricated square tubular sleeve, and produces a tighter connection between adjacent torque tube portions. The swaging of the tube ends 133 can be carried out at low cost on line production equipment.

The term "earth" as used in reference to the foundation for the pier footings is not limited to soils and natural terrain surfaces. The solar collectors of this invention can be installed on an artificial surface, such as a building rooftop, or on the upper level of a parking ramp.

While the invention has been described hereinabove with reference to some selected preferred embodiments, it should be recognized that the invention is not limited to those precise embodiments. Rather, many modification and variations would present themselves to persons skilled in the art without departing from the scope and spirit of this invention, as defined in the appended claims.

I claim:

1. A solar energy collector and tracker arrangement which comprises a north-south oriented torsion tube defining a north-south axis; an array of flat rectangular solar panels attached along opposite sides of said torsion tube; at least one pier having a footing supported in a foundation and a pivot member affixed thereto above said footing and in which said torsion tube is journaled to permit the array of solar panels to be rocked on said north-south axis to follow motion of the sun relative to the earth; a torque-arm member supported on said torsion tube and having an eye portion displaced from said north-south axis; and a linear actuator having a body portion mounted on a footing supported in the foundation at a distance spaced from said pier and a rod that extends from said body portion and has a distal end coupled to the eye portion of the torque-arm member.

2. A solar energy collector and tracker arrangement according to claim 1 wherein said actuator is vertically oriented and said rod extends generally vertically from said body portion to the eye portion of said torque-arm member.

3. A solar energy collector and tracker arrangement according to claim 1 wherein said actuator is horizontally oriented and said rod extends generally horizontally from said body portion to the eye portion of said torque-arm member.

4. A solar energy collector and tracker arrangement according to claim 3 wherein said torque-arm member extends generally at a right angle to a plane defined by said solar panels.

5. A solar energy collector and tracker arrangement according to claim 1 wherein said torsion tube is generally of square cross section.

6. The solar energy collecting and tracker arrangement according to claim 5, wherein said torsion tube is formed of two or more sections, and with one of the sections having one end swaged to fit tightly into the end of a next successive section to form a tight, secure coupling between said sections.

7. A solar energy collector and tracker arrangement according to claim 5 wherein said pivot member includes a bearing formed of an outer generally cylindrical journal and four inserts disposed on respective sides of said square cross section torsion tube within said journal.

8. A solar energy collector and tracker arrangement according to claim 7, wherein said inserts are formed of a plastic resin.

9. A solar energy collector and tracker arrangement according to claim 8, wherein said plastic resin contains a lubricant.

10. A solar energy collector and tracker arrangment according to claim 9, wherein said plastic resin contains a UV-inhibiting agent.

11. A solar energy collector and tracker arrangement comprising multiple parallel rows of solar panels, wherein each said row includes a north-south oriented torsion tube defining a north-south axis; an array of flat generally rectangular solar panels attached along opposite sides of their associated torsion tube, at least one pier having a footing supported in a foundation and a pivot member affixed thereto above said footing and in which the associated torsion tube is journaled to permit the array of solar panels to be rocked on their north-south axis to follow motion of the sun relative to the earth, a torque-arm member supported on said torsion tube and having an eye portion displaced from said north-south axis at a generally right angle relative to a plane defined by the row of solar panels; and wherein a tracker drive for said multiple rows includes a linear actuator having a body mounted on a footing supported in the foundation and a rod that extends generally horizontally from said body, means coupling said rod to the eye portion of the torque-arm member of a first one of said rows, and rigid linkage means extending generally horizontally from the torque-arm member of said first row to the torque-arm members of the others of said rows.

12. The solar energy collecting and tracker arrangement according to claim 11, wherein said rigid linkage means includes a series of rigid link members articulated to one another and to the torque-arm members of the respective rows of solar panels.

13. The solar energy collecting and tracker arrangement according to claim 11, wherein each of said torsion tubes is generally of square cross section.

14. The solar energy collecting and tracker arrangement according to claim 13, wherein at least some of said torsion tubes are each formed of two or more sections, and with one of the sections having one end swaged to fit tightly into the end of a next successive section to form a tight, secure coupling between said section.

15. The solar energy collecting and tracker arrangement according to claim 11, wherein said multiple includes eight or more such rows and said tracker device is configured as a single drive to rock all of said eight or more rows of solar panels.

16. A solar energy collector and tracker arrangement according to claim 11, wherein each said pivot member includes a bearing formed of an outer cylindrical journal and four inserts disposed on respective sides of the associated square cross section torsion tube within said cylindrical journal.

17. A solar energy collector and tracker arrangement according to claim 16, wherein said inserts are formed of a plastic resin.

18. A solar energy collector and tracker arrangement according to claim 17, wherein said plastic contains a lubricant and a UV-inhibiting agent.

19. A solar energy collector and tracker arrangment according to claim 11, wherein electrical wiring is concealed within said torsion tubes, said torque arms and said linkage means.

* * * * *